April 22, 1952
E. C. S. CLENCH
2,593,537
MOTOR CONTROL FOR FLUID PRESSURE SYSTEMS
Filed July 17, 1944
2 SHEETS—SHEET 1
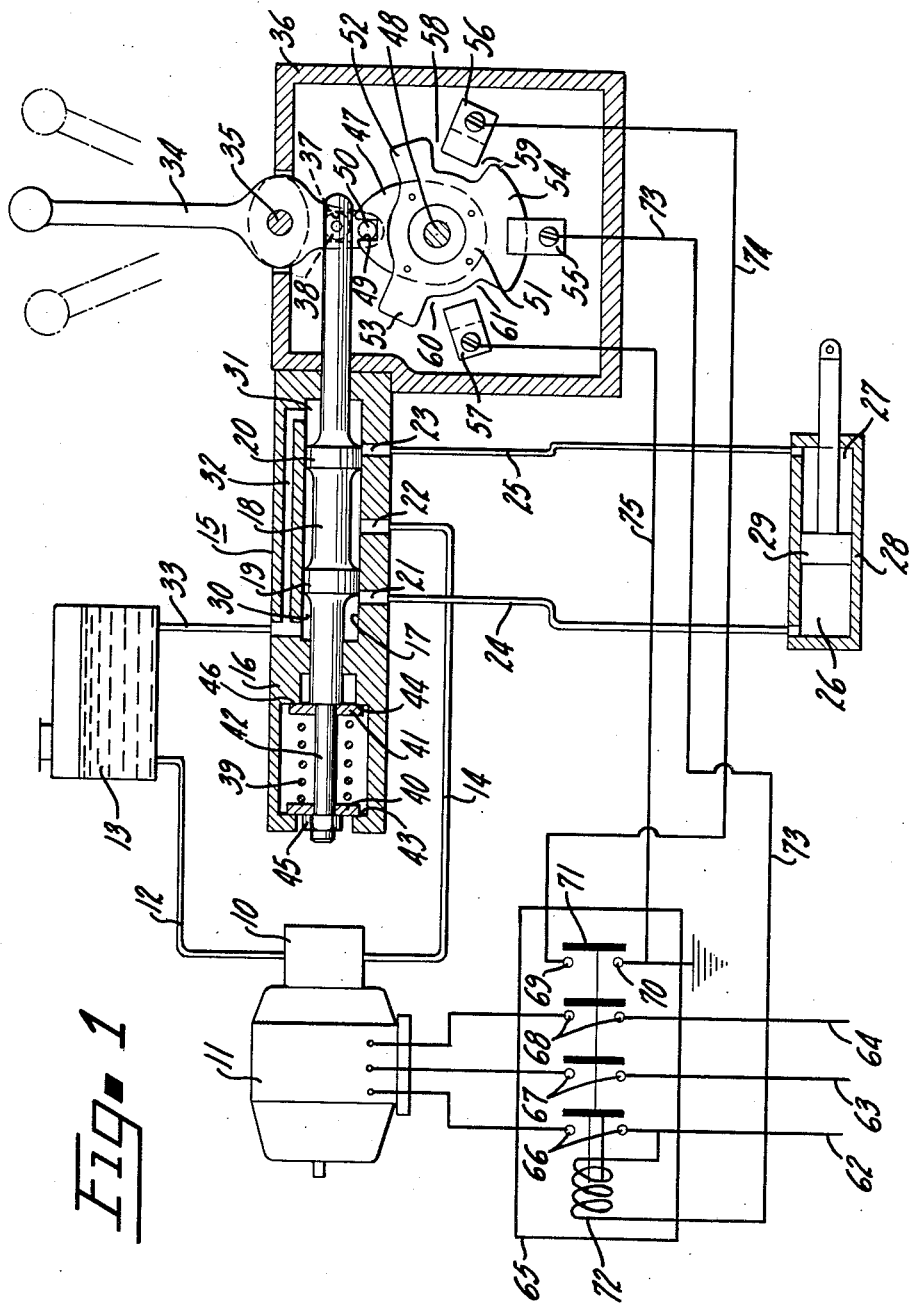
INVENTOR
EDWARD CLAUDE SHAKESPEARE CLENCH
BY
Cecil F. Arens
ATTORNEY

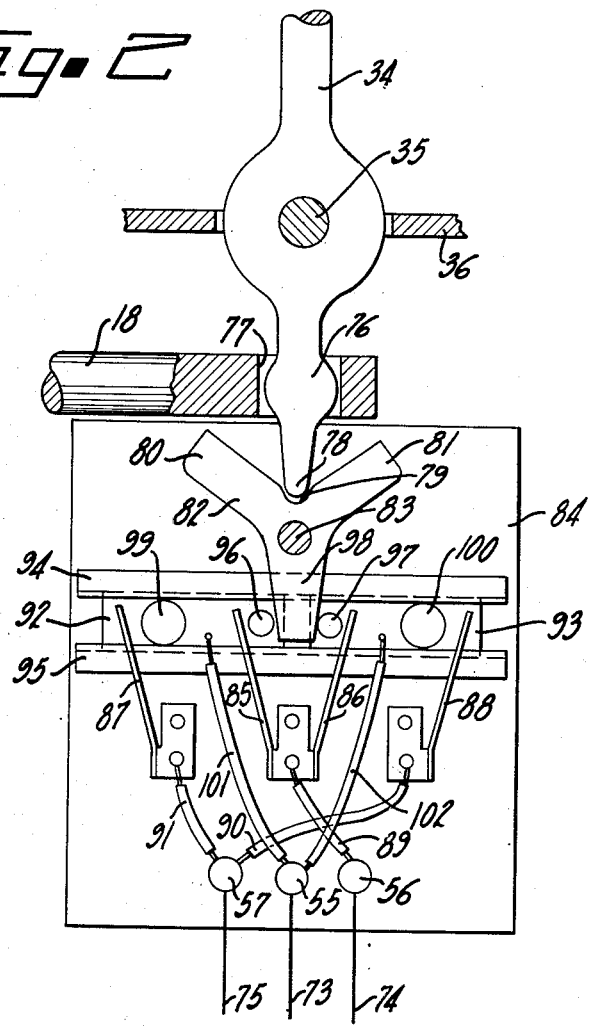

Patented Apr. 22, 1952

2,593,537

UNITED STATES PATENT OFFICE 2,593,537

MOTOR CONTROL FOR FLUID PRESSURE SYSTEMS

Edward Claude Shakespeare Clench, Leamington Spa, England, assignor to Automotive Products Company Limited, Leamington Spa, England Application July 17, 1944, Serial No. 545,302
In Great Britain August 23, 1943

3 Claims. (Cl. 318—446)

This invention relates to relay action electric switches, such as those used for controlling motor-pump units of fluid pressure systems. Switches of this form are usually operated by "start" and "stop" push buttons and when used in conjunction with the motor-pump units of fluid pressure systems they require to be operated manually apart from the actuation of the control valve for working the fluid pressure system.

It is an object of the invention to provide an improved form of relay action electric switch which is lever operated and in which the manually actuated part is readily adapted to be incorporated in the control means of a fluid pressure system, such as a hydraulic remote control system. A further object is to provide an improved and compact form of control unit for a hydraulic remote control system, said unit incorporating means for bringing a motor-pump into operation automatically.

In controlling means for an electric power circuit having a relay-action electric switch comprising a main supply switch, an electro-magnet arranged, when energised, to close the main supply contacts, an auxiliary pair of contacts which is connected in series with the electro-magnet and is closed in common with the main supply contacts, and means for controlling the current to the electro-magnet, the present invention is characterised by the fact that the said controlling means comprises two pilot switches which are operated one before the other by movement of an operating member from an inoperative position to an operative position, the first pilot switch being connected in series with the electro-magnet and auxiliary contacts, and the second pilot switch being connected in parallel with the auxiliary contacts. Preferably the operating member is in the form of a lever, which may conveniently constitute or be connected with means for controlling a hydraulic remote control system.

According to a further feature of the invention there is provided in conjunction with the control member of a fluid pressure remote control system, an electric switch device which is operated by said control member and acts to bring a motor-pump into action to supply pressure fluid when the control member is moved towards an operative position. The said switch device conveniently comprises a pair of pilot electric switches which are operated one after the other and which are arranged to control the flow of current through the electro-magnet of a relay-action electric switch, the second pilot switch to be operated by movement of the control member in one direction serving to close the relay-action switch, and the second pilot switch to be operated by movement of the control member in the opposite direction serving to open the relay-action switch. Where the control member is movable in either direction away from a central inoperative position, two pairs of pilot switches can conveniently be provided, one pair for operation by movement of the control member in one direction and the other pair for operation by movement in the other direction, corresponding switches of the two pairs conveniently being connected together in parallel.

Preferably a pair of pilot switches for operation in sequence comprises a common contact member movable by the control member, a first contact member which is engaged by the common contact member after a short travel of the control member from its neutral position, and a second contact member which is engaged after a substantial further movement of the control member, thus connecting together all three of said contact members. If desired the common contact member may be mounted so as to be moved angularly by the control member, said contact member carrying two radial contact fingers, which latter are arranged to co-operate in sequence with a stationary first contact member and a stationary second contact member as the control member is moved away from its neutral position. The common contact member may be formed with a pair of fingers either of which engages the first contact member, depending upon the direction in which the control member is moved, and with a corresponding pair of fingers for subsequent engagement with the second contact member.

In an alternative arrangement the first and second contact members comprise spring fingers engaged in sequence by projections carried by the common contact member, the common contact member conveniently comprising a strip which is reciprocated by movement of the control member. Thus a pair of common contact members may be provided, one or other being actuated by movement of the control member, depending upon the direction of such movement.

The invention is illustrated in the accompanying diagrammatic drawings, in which:

Figure 1 is a general view of a typical liquid pressure system, the control device being shown in section; and Figure 2 is a fragmentary elevation, partly ir section, showing a modified form of switch mechanism.

In the hydraulic remote control system which is shown in Figure 1 a pump 10 driven by an electric motor 11 receives liquid through a pipe 12 from a reservoir 13 and delivers it under pressure through a pipe 14 leading to a selector valve indicated generally at 15. This selector valve comprises a body 16 having a bore 17 within which a piston valve member 18 is axially slidable, said piston valve member being formed with a pair of circumferential lands 19 and 20 arranged to control the flow of liquid through three axially spaced ports 21, 22 and 23. The port 22 receives pressure liquid from the pipe 14, while the ports 21 and 23 are connected by interchangeable flow and return pipe lines 24 and 25 with the working spaces 26 and 27 respectively of a double-acting motor unit 28 having a piston 29. Spaces 30 and 31 at the ends of the bore 17 are connected permanently with the reservoir 13 by a longitudinal passage 32 in the body 16 and by a return pipe 33. The piston valve member 18 is operated by a control lever 34 pivoted at 35 to a switch casing 36, which latter is securely attached to the selector valve 15. Where the piston valve member 18 projects into the switch casing 36, it is formed at one side with a groove 37, which latter accommodates between its walls a roller 38 pivoted to the depending part of the lever 34; thus the piston valve member 18 is permitted to slide along its axis while the roller 38 carried by the lever 34 makes an arcuate movement about the axis of the pivot 35. The piston valve member 18 is urged resiliently towards its central position, as shown, by means of a coiled compression spring 39 acting to press apart a pair of washers 40 and 41, which latter are slidably mounted upon a reduced diameter stem 42 of the valve member 18. The outer part of the washer 40 bears against a flange or shoulder 43 upon the body 16, while in a corresponding manner the washer 41 engages at its outer part against a shoulder 44 also formed upon said body 16. At the same time the outer part of the washer 40 engages a nut 45 mounted upon the stem 42, while the washer 41 bears against a shoulder 46 upon the valve member 18; it will thus be seen that the coiled compression spring 39 has its maximum length when the valve member 18 is in its central or normal position as shown, and that movement of said valve member in either direction causes the spring to become shortened, one or other of the washers 40 and 41 sliding upon the stem 42. The spring 39, acting through the piston valve member 18, also serves to centralise the control lever 34.

When the selector valve 15 is in its normal position, as shown, the lands 19 and 20 serve to isolate the pressure port 22, whereas both of the motor ports 21 and 23 are in free communication with the reservoir 13; when the valve member 18 is moved to the left the land 19 moves across and beyond the port 21, thus connecting the latter with the output from the pump 10, so that the motor piston 29 is moved to the right, while in a similar manner movement of the piston 29 to the left is brought about by shifting the valve member 18 to the right so as to deliver pressure liquid through the port 23 and into the pipe line 25.

As it is undesirable that the pump 10 should be running continuously, even when the remote control system is inoperative, provision is made whereby the electric motor 11 is brought into action automatically whenever the control lever 34 is moved away from its central position. For this purpose the control lever 34 is arranged to actuate a pilot switch device within the casing 36; said device comprising a rotor member 47 mounted to move angularly upon a fixed pivot pin 48 and formed at its upper part with a radial notch 49, which latter is engaged by a pin 50 carried at the lower extremity of the control lever 34. Attached to the rotor member 47, but electrically insulated from the casing 36, is a common contact member in the form of a plate 51. This has at its upper part a pair of ears 52 and 53, while its lower part is formed with an arcuate flange 54 serving to connect the contact member 51 continuously with a fixed terminal fitting 55. A first terminal fitting 56 and a second terminal fitting 57 are also mounted within the switch casing 36, but are electrically insulated from the terminal fitting 55. When the control lever 34 is in its central position the first terminal member 56 is disposed centrally with respect to the space between the ear 52 and the adjacent end of the flange 54, and it follows, therefore, that the gaps 58 and 59 on either side of the terminal fitting 56 are equal. The second terminal fitting 57 is disposed halfway between the ear 53 and the adjacent end of the flange 54, thus making the gaps 60 and 61 equal in size; however, the gaps 60 and 61 are purposely made substantially larger than the gaps 58 and 59. Thus when the control lever 34 is moved away from its central position the contact member 51 first makes contact with the terminal member 56 and then, after a substantial further movement the control lever 34, contact is established between the contact member 54 and the second terminal fitting 57. This effect occurs during movement of the control lever 34 in either direction from its central position.

The electric motor 11 is fed with current from a three-phase Y-connected transformer supply, the input leads being indicated at 62, 63 and 64. The supply is controlled by an electro-magnetically operated contactor of the customary form indicated at 65 and having, in addition to the three main pairs of contacts 66, 67 and 68, an auxiliary pair of contacts 69, 70 adapted to be closed by a contact member 71 whenever the solenoid 72 is energized to close the main supply circuit. The solenoid 72 is connected at one end to the input lead 62, while its other end is connected by a wire 73 with the terminal fitting 55. The first terminal fitting 56 is connected by a wire 74 with the auxiliary contact 69, while the second terminal fitting 57 has a wire 75 connecting it with the auxiliary contact 70. The latter is also connected to earth to secure a source of e. m. f. for the solenoid 72, although it may if desired be connected with either of the supply leads 63 and 64 for the same purpose. It will thus be seen that the first pilot switch (constituted by the first terminal fitting 56 and the common contact member 51) is connected in series with the solenoid 72 and the auxiliary contacts 69, 70; the second pilot switch (constituted by the second terminal member 57 and the common contact member 51) is, however, merely disposed in series with the solenoid 72.

The action of the switch device is as follows. With the control lever 34 in its central position as shown the circuit through the solenoid 72 is broken, so that the supply of current to the motor is interrupted at the pairs of contacts 66, 67 and 68. As the control lever 34 is moved, say, in an anti-clockwise direction, the ear 52 engages with the terminal fitting 56 after a few degrees of movement, but this is ineffective, as the circuit through the solenoid 72 is still broken at the auxiliary contacts 69, 70. As the movement of the control lever 34 continues, however, the end of the arcuate flange 54 engages with the second terminal fitting 57, thus enabling the solenoid 72 to be energised and causing the current supply to be switched on to the electric motor 11, the auxiliary contacts 69, 70 being bridged at the same time by the contact member 71. Pressure liquid delivered by the pump 10 is thus directed by the selector valve 15 to the hydraulic motor 28, and when the piston 29 of the latter has made the requisite movement the control lever 34 is returned to its central position. During this return movement the common contact member 51 first separates from the second terminal fitting 57, but this does not interrupt the circuit through the solenoid 72, owing to the fact that the auxiliary contacts 69 and 70 are closed, so that the supply to the electric motor 11 continues to be effective until the common contact member 51 disengages from the first terminal fitting 56 as the control lever 34 nearly reaches its central position. By the use of the two pilot switches corresponding with the terminal fittings 56 and 57 respectively a decisive control of the current through the solenoid 72 is assured, for the lever 34 has to be moved through an angle of several degrees to bring about the making and the breaking (or vice versa) of the circuit, so that it is quite impossible for the lever 34 to be placed in any particular position where the solenoid is energised only partially or intermittently, which would cause damage to the contacts due to arcing.

A modified form of switch device is shown in Figure 2 and is suitable for use with the selector valve 15 and motor contactor 65 described above. In this case the lower part of the control lever 34 has a circular enlargement 76, which is adapted to engage slidably within a diametral slot 77 forming the end part of the piston valve member 18. The lower part of the lever 34 is somewhat pointed, as indicated at 78, and is arranged normally to occupy a notch 79 between the limbs 80 and 81 of a Y-shaped rocker 82 pivoted at 83 to the base 84 of the switch. This base is conveniently composed of electrical insulating material and carries four switch contacts, namely two inner contacts 85 and 86, and two outer contacts 87 and 88. Each of these contacts is in the form of a spring arm, the inner two being connected with a terminal 56 by an insulated wire 89, while the outer two are connected by wires 90 and 91 with a terminal 57. Mounted upon the base 84 are two flat metal bars 92 and 93, which are fitted between undercut guide members 94 and 95 so as to be free to slide laterally, springs (not shown) being provided to urge the bars 92 and 93 inwardly so that metal lugs 96 and 97 engage resiliently with the central stem 98 of the rocker 82, thus centralising the latter. When the rocker is in its central or normal position these lugs 96 and 97 are both spaced from the corresponding switch members 85 and 86, but by a relatively short distance in each case, whereas an outer pair of lugs 99 and 100 are spaced by a much greater distance from the corresponding switch members 87 and 88. The bars 92 and 93 are connected by wires 101 and 102 with a central terminal 55.

The manner in which the switch shown in Figure 2 operates is as follows, the electrical circuit being the same as that shown in Figure 1. When the control lever 34 is in its central position contact is completely broken between the terminals 55, 56 and 57, and when the control lever is moved in either direction its lower end deflects the rocker 82 at a relatively rapid rate, so that one or other of the lugs 96 and 97 very quickly engages with the corresponding contact member 85 or 86, thus connecting together the terminals 55 and 56. By reference to Figure 1, however, it will be seen that this has no effect on the solenoid 72 of the contactor 65. Continued movement of the control lever 34 causes the corresponding outer projection 99 or 100 to engage with the outer contact member 87 or 88, thus completing the circuit through the terminals 55 and 57; this has the effect of feeding current through the solenoid 72 and bringing the electric motor 11 into operation. When the control lever is being moved back to its central position the circuit through the terminals 57 and 55 is first broken, but the solenoid 72 does not become deenergised until the control lever 34 has been moved sufficiently far to break the circuit through the terminals 55 and 56.

It will be understood that the arrangements which have been described are given merely by way of example and that various modifications may be made to suit requirements. Thus, various forms of switches are applicable to the invention, such, for instance, as mercury switches, while, of course, the invention can be applied to various fluid pressure supply systems other than those for hydraulic remote control.

What I claim is:

1. In a motor control system, the combination with a source of current supply and an electric motor, of a magnetically-controlled switch comprising a main switch connected between the current supply and said motor and having an electro-magnet operatively connected to the main switch to close the same when the magnet is energized, a control circuit including said electro-magnet, an auxiliary switch in the control circuit, said auxiliary switch being operatively connected to said electro-magnet to be closed simultaneously with the main switch, and a manually settable switch in the control circuit having a member movable in either direction from an inoperative position to an operative position via first and second positions, in the first position the manually settable switch is in series with the electro-magnet and the auxiliary switch, and in the second position said manually settable switch is in parallel with said auxiliary switch.

2. In a motor control system, the combination with a source of current supply and an electric motor, of a magnetically-controlled switch comprising a main switch connected between the current supply and said motor and having an electro-magnet operatively connected to the main switch to close the same when the magnet is energized, a control circuit including said electro-magnet, an auxiliary switch in the control circuit, said auxiliary switch being operatively connected to said electro-magnet to be closed simultaneously with the main switch, and a manually settable switch in the control circuit having a member movable in either direction from an inoperative position to an operative position via first and second positions, in the first position the manually settable switch is in series with the electro-magnet and the auxiliary switch, and in the second position said manually settable switch is in parallel with said auxiliary switch, and spring means for holding said manually settable switch in its inoperative position.

3. In a motor control system, as defined in claim 1, wherein said manually settable switch comprises a common contact element mounted on said movable member, a first contact element, engageable by the common contact element after a short travel of said member from its inoperative position, and a second contact element engageable by the common contact element after further movement of said member to thereby connect together all of said contact elements.

EDWARD CLAUDE
SHAKESPEARE CLENCH.

REFERENCES CITED

The following references are of record in the file of this patent:

UNITED STATES PATENTS

| Number | Name | Date |
| --- | --- | --- |
| 749,439 | Ihlder | Jan. 12, 1904 |
| 952,650 | Sundh | Mar. 22, 1910 |
| 965,442 | Coyle | July 26, 1910 |
| 981,847 | Eastwood | Jan. 17, 1911 |
| 1,222,207 | Henderson | Apr. 10, 1917 |
| 1,535,924 | Leddick | Apr. 28, 1925 |
| 1,837,212 | Evans | Dec. 22, 1931 |
| 1,880,524 | Taylor | Oct. 4, 1932 |
| 1,964,467 | Hunter | June 26, 1934 |
| 1,978,737 | Bower et al. | Oct. 30, 1934 |
| 2,016,472 | Wilms | Oct. 8, 1935 |
| 2,110,313 | Warrick | Mar. 8, 1938 |
| 2,167,227 | Wilson | July 25, 1939 |
| 2,170,310 | Shivers | Aug. 22, 1939 |
| 2,224,526 | Sessions | Dec. 10, 1940 |
| 2,301,446 | Ott | Nov. 10, 1942 |
| 2,308,295 | Miller | Jan. 12, 1943 |